United States Patent
Katayama

(10) Patent No.: US 7,829,967 B2
(45) Date of Patent: Nov. 9, 2010

(54) RESIN FOR OPTICAL-SEMICONDUCTOR-ELEMENT ENCAPSULATION CONTAINING POLYIMIDE AND OPTICAL SEMICONDUCTOR DEVICE OBTAINED WITH THE SAME

(75) Inventor: Hiroyuki Katayama, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 29 days.

(21) Appl. No.: 12/259,317

(22) Filed: Oct. 28, 2008

(65) Prior Publication Data

US 2009/0121255 A1    May 14, 2009

(30) Foreign Application Priority Data

Nov. 9, 2007    (JP)    ............... 2007-292310

(51) Int. Cl.
*H01L 31/0203*    (2006.01)
*H01L 23/58*    (2006.01)

(52) U.S. Cl. .............. 257/433; 257/642; 257/643; 257/E51.027

(58) Field of Classification Search ........ 257/433, 257/642, 643, E51.027
See application file for complete search history.

(56) References Cited

U.S. PATENT DOCUMENTS 7,521,167 B2 * 4/2009 Hasegawa et al. .......... 430/192
2005/0227569 A1 * 10/2005 Maeda et al. .............. 445/25
2007/0059517 A1 * 3/2007 Yao et al. ................ 428/319.1
2007/0170840 A1 * 7/2007 Chang-Hae et al. ........ 313/503

FOREIGN PATENT DOCUMENTS

| EP | 0 725 302 A2 | 8/1996 |
| EP | 1 514 888 A1 | 3/2005 |
| JP | 63-7657 A | 1/1988 |
| JP | 7-309927 A | 11/1995 |
| WO | 2008/004615 A1 | 1/2008 |

OTHER PUBLICATIONS

Qinghua Li et al., "Absorption, Fluorescence, and Thermal Properties of Transparent Polyimides Based on Cyclobutanetetracarboxylic Dianhydride", Polymer Journal, 1998, pp. 805-812, vol. 30, No. 10, Society of Polymer Science, Tokyo, Japan, XP002927597.
European Search Report dated Aug. 28, 2009.

* cited by examiner

*Primary Examiner*—Ngan Ngo
(74) *Attorney, Agent, or Firm*—Sughrue Mion, PLLC

(57) ABSTRACT

The present invention relates to a resin for optical-semiconductor-element encapsulation containing a polyimide which is produced by imidizing a polyimide precursor obtained by subjecting 5-norbornene-2,3-dicarboxylic anhydride or maleic anhydride, an aliphatic tetracarboxylic dianhydride, and an aliphatic diamine compound to a condensation polymerization reaction. The resin of the invention has excellent heat resistance and excellent light-transmitting properties. In addition, the present invention also relates to an optical semiconductor device containing an optical semiconductor element encapsulated with the resin.

14 Claims, No Drawings

RESIN FOR OPTICAL-SEMICONDUCTOR-ELEMENT ENCAPSULATION CONTAINING POLYIMIDE AND OPTICAL SEMICONDUCTOR DEVICE OBTAINED WITH THE SAME

FIELD OF THE INVENTION

The present invention relates to a resin for optical-semiconductor-element encapsulation which contains a polyimide; and to an optical semiconductor device containing an optical semiconductor element encapsulated with the resin.

BACKGROUND OF THE INVENTION

With the recent trend toward improvements in luminous efficiency and luminous flux and increase in current density in light-emitting diodes (LEDs), the deterioration of LED encapsulation resins has become a problem because it is causative of LED life shortening. In general, epoxy resins are frequently used as LED encapsulation resins. However, it is known that the enhanced heat generation due to the increase in injection current density further accelerates the deterioration of the epoxy resins.

Specifically, examples of the resins for use in the encapsulation of optical semiconductor elements include an alicyclic epoxy resin (see, JP-A-7-309927) and a polyimide-containing resin obtained by reacting an aromatic acid dianhydride with an aromatic diamine compound (see, JP-A-63-7657).

However, alicyclic epoxy resins still have insufficient heat resistance, while polyimide-containing resins obtained by reacting an aromatic acid dianhydride with an aromatic diamine compound are not sufficient in heat resistance and light-transmitting properties.

SUMMARY OF THE INVENTION

An object of the invention is to provide a polyimide-containing resin for optical-semiconductor-element encapsulation which has excellent heat resistance and excellent light-transmitting properties. Another object of the invention is to provide an optical semiconductor device containing an optical semiconductor element encapsulated with the resin.

Namely, the invention relates to the following items 1 to 7.

1. A resin for optical-semiconductor-element encapsulation comprising a polyimide which is produced by imidizing a polyimide precursor obtained by subjecting 5-norbornene-2,3-dicarboxylic anhydride or maleic anhydride, an aliphatic tetracarboxylic dianhydride, and an aliphatic diamine compound to a condensation polymerization reaction.

2. The resin for optical-semiconductor-element encapsulation according to item 1, wherein the aliphatic tetracarboxylic dianhydride is 1,2,3,4-butanetetracarboxylic dianhydride or 1,2,3,4-cyclopentanetetracarboxylic dianhydride.

3. The resin for optical-semiconductor-element encapsulation according to item 1, wherein the aliphatic diamine compound is at least one member selected from the group consisting of the compounds represented by the following formulae (I) to (V):

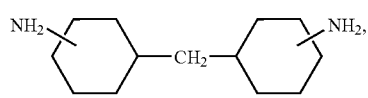
(I)

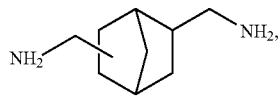
(II)

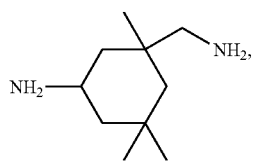
(III)

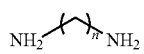
(IV)

wherein n is an integer of 4 to 18, and

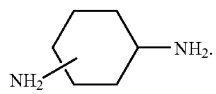
(V)

4. The resin for optical-semiconductor-element encapsulation according to item 1, wherein the polyimide precursor has a number-average molecular weight of 3,000 to 50,000.

5. The resin for optical-semiconductor-element encapsulation according to item 1, wherein the polyimide precursor has a degree of polymerization of 5 to 1,000.

6. The resin for optical-semiconductor-element encapsulation according to item 1, which has a light transmittance, as measured at a wavelength of 400 nm, of 99% or higher.

7. An optical semiconductor device comprising an optical semiconductor element encapsulated with the resin according to item 1.

The resin for optical-semiconductor-element encapsulation according to the invention has excellent heat resistance and excellent light-transmitting properties. Consequently, the optical semiconductor device containing an optical semiconductor element encapsulated with this resin has excellent heat resistance and excellent light-transmitting properties.

DETAILED DESCRIPTION OF THE INVENTION

The resin for optical-semiconductor-element encapsulation of the invention contains a polyimide which is obtained by imidizing a polyimide precursor obtained by subjecting 5-norbornene-2,3-dicarboxylic anhydride or maleic anhydride, an aliphatic tetracarboxylic dianhydride, and an aliphatic diamine compound to a condensation polymerization reaction.

Examples of the aliphatic tetracarboxylic dianhydride include the same aliphatic tetracarboxylic dianhydrides as those which have been used for producing polyimides and polyimide precursors. However, 1,2,3,4-butanetetracarboxylic dianhydride and 1,2,3,4-cyclopentanetetracarboxylic dianhydride are preferred from the standpoints of the heat resistance and transparency of the product, availability, and handleability. Such dianhydrides may be used alone or in combination of two or more thereof.

Examples of the aliphatic diamine compound include the same aliphatic diamine compounds as those which have been used for producing polyimides and polyimide precursors. However, from the standpoints of the heat resistance and transparency of the product, availability, and handleability, it is preferred that the diamine compound be at least one member selected from the group consisting of the compounds represented by the following formulae (I) to (V).

Formula (I):

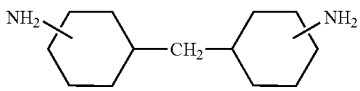

Formula (II):

Formula (III):

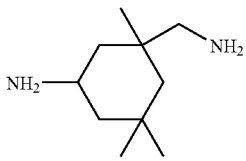

Formula (IV):

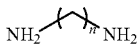

(In the formula (IV), n is preferably an integer of 4 to 18, and is more preferably an integer of 4 to 8.)

Formula (V):

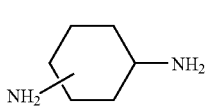

These diamine compounds may be used alone or in combination of two or more thereof.

The resin for encapsulation according to the invention may be one produced from the starting materials which further include a diamine compound other than the aliphatic diamine compounds represented by the formulae (I) to (V), so long as use of such a diamine compound does not impair the effects of the invention. However, from the standpoint of obtaining excellent light-transmitting properties and excellent heat resistance, which is an object of the invention, the use amount of the aliphatic diamine compound represented by the formulae (I) to (V) is preferably 80 to 100% by weight, more preferably 90 to 100% by weight, even more preferably 95 to 100% by weight, based on the mixture of the diamine compound and aliphatic diamine compound to be subjected to the reaction.

In the condensation polymerization reaction in the invention, it is preferred that the starting materials be mixed so that the molar ratio among the compounds satisfies the following relationship:

{(number of moles of aliphatic tetracarboxylic dianhydride)+[½×(number of moles of 5-norbornene-2,3-dicarboxylic anhydride or maleic anhydride)]}:(number of moles of aliphatic diamine compound) is substantially 1:1.

Examples of organic solvents usable in the condensation polymerization reaction include N,N-dimethylformamide, N,N-dimethylacetamide, N-methyl-2-pyrrolidone, N-methylcaprolactam, dimethyl sulfoxide, pyridine, tetrahydrofuran, cyclohexanone, and 1,4-dioxane. These solvents may be used alone or in combination of two or more thereof.

The polyimide precursor obtained by subjecting those compounds to a condensation polymerization reaction preferably has a number-average molecular weight of 3,000 to 50,000. In this specification, the number-average molecular weights of polyimide precursors are ones determined by nuclear magnetic resonance spectroscopy (NMR).

Examples of the imidization reaction include thermal imidization reaction and imidization reaction caused by a chemical reaction, and in the invention, it is preferred to conduct thermal imidization reaction. The thermal imidization reaction is conducted in the temperature range of preferably 50 to 400° C., more preferably 100 to 250° C. This reaction may be performed continuously, and may be performed under vacuum or in an inert gas atmosphere. In the invention, the reaction may be conducted, for example, at 100° C. for 1 hour, subsequently at 150° C. for 1 hour, and then at 200° C. for 1 hour, from the standpoint of maintaining colorlessness and transparency, thereby obtaining a polyimide-containing resin for optical-semiconductor-element encapsulation.

In the case where the polyimide precursor is imidized in a sheet form, the following method can, for example, be used. A solution of the polyimide precursor is diluted with an organic solvent such as N,N-dimethylacetamide or N-methyl-2-pyrrolidone according to the necessity. The solution is then applied in an appropriate thickness to a release sheet (e.g. polyester film), glass substrate, or the like which has a silicone-treated surface, by a technique such as casting, spin coating, or roll coating. The polyimide precursor solution applied is subjected to the thermal imidization reaction, whereby a sheet-form resin can be obtained.

The polyimide precursor or the polyimide obtained by imidizing the precursor, when subjected to structural analysis by NMR or IR spectroscopy, show the following characteristic peaks.

Polyimide precursor: ($^1$H NMR (DMSO-$d_6$ solution): δ 12.3, 8.3-7.5, 6.2-5.9, 3.7-2.6, 2.0-0.7)

Polyimide: (IR: 1702-1678, 1407-1381 $cm^{-1}$)

Furthermore, the degree of polymerization n of the polyimide precursor, as determined from integral ratio between the signal attributable to main-chain NH and the signal attributable to a terminal olefin, is preferably 5 to 1,000, more preferably 9 to 200.

In the case where the polyimide-containing resin for optical-semiconductor-element encapsulation has a sheet form having a thickness of, e.g., 10 to 200 μm, the light transmittance thereof, as measured at a wavelength of 400 nm, is preferably 90% or higher, more preferably 95% or higher, even more preferably 99% or higher, from the standpoint of the durability of the optical semiconductor device. In this specification, light transmittance is measured by the method described in the Examples which will be given later.

The polyimide-containing resin thus obtained has excellent light-transmitting properties and excellent heat resistance. It is hence suitable for use as a resin for optical-semiconductor-element encapsulation, which is used in, for example, an optical semiconductor device including a blue or white LED element mounted therein (e.g., a backlight for liquid-crystal screens, traffic signal, large outdoor display, or advertising signboard). Consequently, the invention further provides an optical semiconductor device containing an optical semiconductor element encapsulated with the resin for optical-semiconductor-element encapsulation.

Since the above-mentioned resin has a double bond at each molecular end, a silicone resin, epoxy resin, acrylic resin, or the like can be bonded to the molecular end thereof according to the necessity to thereby regulate flexibility, adhesiveness, moisture resistance, etc.

In general, a resin having no acid anhydride in the molecule thereof has an acid anhydride group or amino group at each molecular end. Because of this, when the silicone resin, epoxy resin, acrylic resin, or the like as mentioned above is to be bonded to such a resin, it is difficult to design a reaction. In contrast, since each molecular end of the resin according to the invention always has a double bond, reaction design is easy.

The optical semiconductor device of the invention can be produced by encapsulating an optical semiconductor element such as an LED element with the resin for optical-semiconductor-element encapsulation of the invention, i.e., with the polyimide precursor which has not been imidized or with the polyimide obtained by imidizing the polyimide precursor. Specifically, in the case where the polyimide precursor is used, the polyimide precursor is applied as it is to a substrate having an LED element mounted thereon in an appropriate thickness by a technique such as casting, spin coating, or roll coating, and the precursor applied is then heated and dried to thereby produce an optical semiconductor device. In the case of using the polyimide, an optical semiconductor device can be produced, for example, by superposing a polyimide-containing sheet formed by a technique such as casting, spin coating, or roll coating so as to have an appropriate thickness on a substrate having an LED element mounted thereon and then laminating the sheet to the substrate with a laminator or the like.

EXAMPLES

Example 1

A dimethylacetamide solution (3.7 mL) of 1.56 g (10.1 mmol) of 2,5(2,6)-bis(aminomethyl)bicyclo[2.2.1]heptane (NBDA: isomer mixture) was added dropwise to a dimethylacetamide solution (13 mL) of 1.78 g (8.99 mmol) of 1,2,3,4-butanetetracarboxylic dianhydride (BDA) and 0.328 g (2.00 mmol) of 5-norbornene-2,3-dicarboxylic anhydride (NBA) at room temperature over 30 minutes. The resultant mixture was stirred at 60° C. for 24 hours to cause it to undergo a condensation polymerization reaction and thereby obtain a solution of a polyimide precursor represented by the following structural formula. Part of the solution was poured into acetone with stirring. As a result, a white solid precipitated. This solid was taken out by filtration, vacuum-dried, and then analyzed for structure by $^1$H NMR spectroscopy and IR spectroscopy.

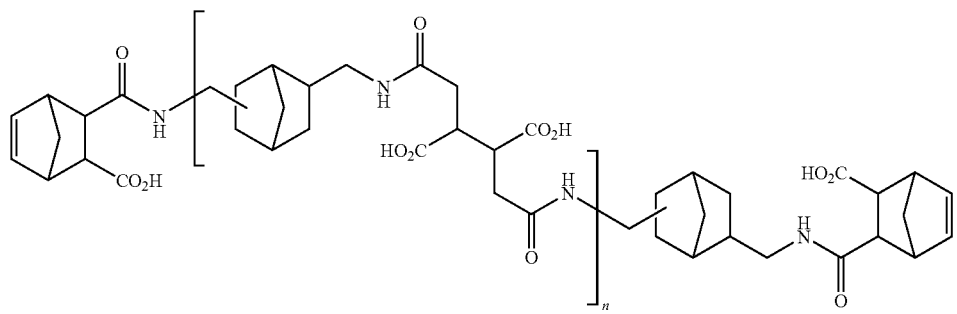

The degree of polymerization n thereof, as determined from integral ratio between the signal attributable to main-chain NH and the signal attributable to a terminal olefin, was found to be 14 (number-average molecular weight, 5,400).

A substrate having a blue light-emitting diode was prepared. The polyimide precursor solution was applied by spin coating to the substrate surface including the blue light-emitting diode. The solution applied was heated at 100° C. for 1 hour, subsequently at 150° C. for 1 hour, and then at 200° C. for 1 hour to imidize the precursor and encapsulate the blue light-emitting diode. Thus, a blue light-emitting diode device was obtained.

The polyimide obtained by imidizing the polyimide precursor had the structure represented by the following structural formula.

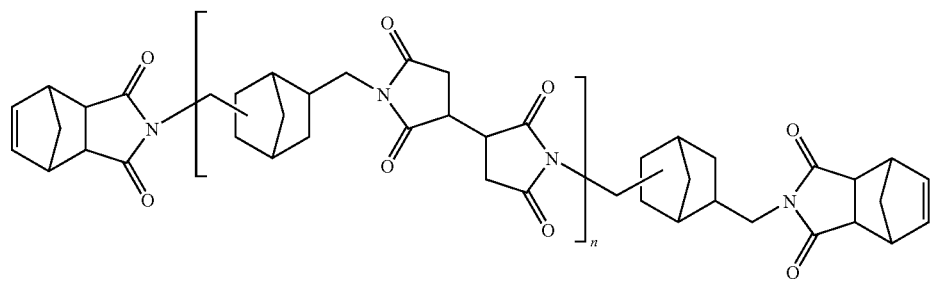

Example 2

A dimethylacetamide solution (10 mL) of 2.11 g (10.1 mmol) of 4,4'-methylenebis(cyclohexylamine) (MBCA) was added dropwise to a dimethylacetamide solution (10 mL) of 1.79 g (9.04 mmol) of 1,2,3,4-butanetetracarboxylic dianhydride (BDA) and 0.327 g (1.99 mmol) of 5-norbornene-2,3-dicarboxylic anhydride (NBA) at room temperature over 30 minutes. The resultant mixture was stirred at 60° C. for 24 hours to cause it to undergo a condensation polymerization reaction and thereby obtain a solution of a polyimide precursor represented by the following structural formula. Part of the solution was poured into acetone with stirring. As a result, a white solid precipitated. This solid was taken out by filtration, vacuum-dried, and then analyzed for structure by $^1$H NMR spectroscopy and IR spectroscopy.

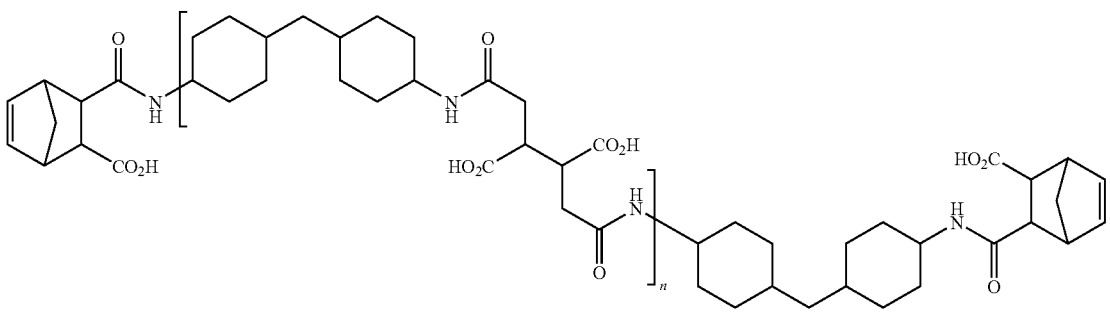

The degree of polymerization n thereof, as determined from integral ratio between the signal attributable to main-chain NH and the signal attributable to a terminal olefin, was found to be 14 (number-average molecular weight, 6,200).

Using the polyimide precursor solution, a blue light-emitting diode device was obtained in the same manner as in Example 1. The polyimide obtained by imidizing the polyimide precursor had the structure represented by the following structural formula.

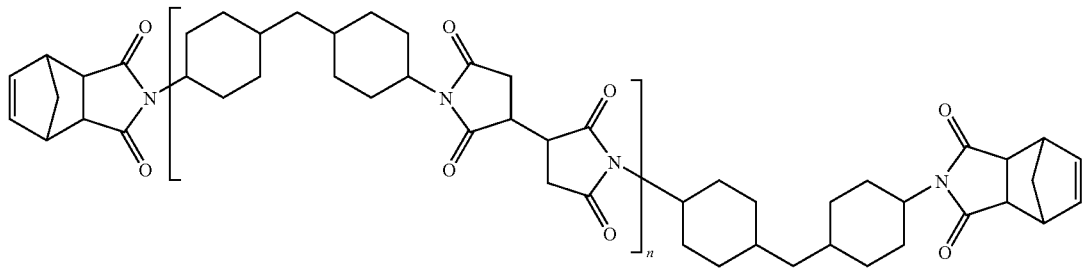

Example 3

A dimethylacetamide solution (4.6 mL) of 1.55 g (10.1 mmol) of 2,5(2,6)-bis(aminomethyl)bicyclo[2.2.1]heptane (NBDA: isomer mixture) was added dropwise to a dimethylacetamide solution (8.0 mL) of 1.89 g (9.00 mmol) of 1,2,3,4-cyclopentanetetracarboxylic dianhydride (CPDA) and 0.328 g (2.00 mmol) of 5-norbornene-2,3-dicarboxylic anhydride (NBA) at room temperature over 30 minutes.

The resultant mixture was stirred at 60° C. for 24 hours to cause it to undergo a condensation polymerization reaction and thereby obtain a solution of a polyimide precursor represented by the following structural formula. Part of the solution was poured into acetone with stirring. As a result, a white solid precipitated. This solid was taken out by filtration, vacuum-dried, and then analyzed for structure by $^1$H NMR spectroscopy and IR spectroscopy.

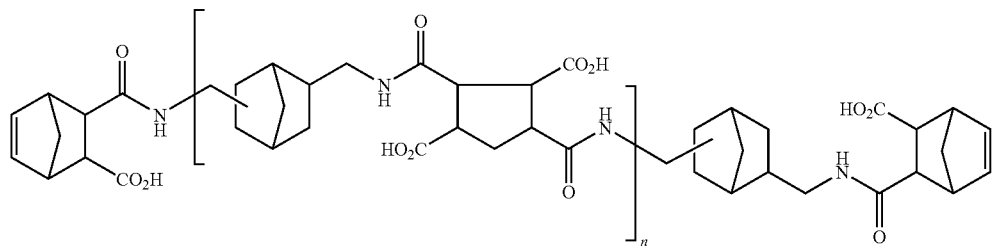

The degree of polymerization n thereof, as determined from integral ratio between the signal attributable to main-chain NH and the signal attributable to a terminal olefin, was found to be 9 (number-average molecular weight, 3,700).

Using the polyimide precursor solution, a blue light-emitting diode device was obtained in the same manner as in Example 1. The polyimide obtained by imidizing the polyimide precursor had the structure represented by the following structural formula.

The degree of polymerization n thereof, as determined from integral ratio between the signal attributable to main-chain NH and the signal attributable to a terminal olefin, was found to be 14 (number-average molecular weight, 5,300).

Using the polyimide precursor solution, a blue light-emitting diode device was obtained in the same manner as in Example 1. The polyimide obtained by imidizing the polyimide precursor had the structure represented by the following structural formula.

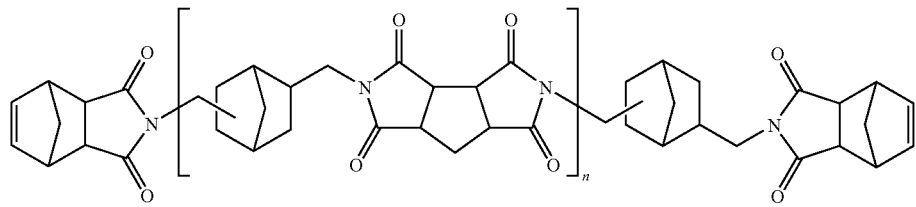

Example 4

A dimethylacetamide solution (3.3 mL) of 1.54 g (10.0 mmol) of 2,5(2,6)-bis(aminomethyl)bicyclo[2.2.1]heptane (NBDA: isomer mixture) was added dropwise to a dimethylacetamide solution (13 mL) of 1.78 g (8.99 mmol) of 1,2,3,4-butanetetracarboxylic dianhydride (BDA) and 0.196 g (2.00 mmol) of maleic anhydride at room temperature over 30 minutes. The resultant mixture was stirred at 60° C. for 24 hours to cause it to undergo a condensation polymerization reaction and thereby obtain a solution of a polyimide precursor represented by the following structural formula. Part of the solution was poured into acetone with stirring. As a result, a white solid precipitated. This solid was taken out by filtration, vacuum-dried, and then analyzed for structure by $^1$H NMR spectroscopy and IR spectroscopy.

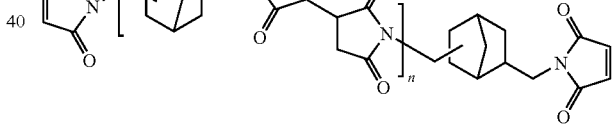

Example 5

A blue light-emitting diode device was obtained in the same manner as in Example 1, except that the amounts of the 1,2,3,4-butanetetracarboxylic dianhydride (BDA) and 5-norbornene-2,3-dicarboxylic anhydride (NBA) were changed to

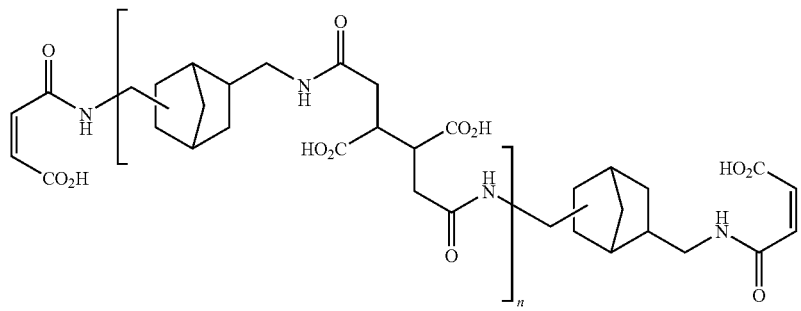

1.91 g (9.65 mmol) and 0.117 g (0.713 mmol), respectively, to obtain a solution of a polyimide precursor having a degree of polymerization n of 39 (number-average molecular weight, 14,200).

Example 6

A blue light-emitting diode device was obtained in the same manner as in Example 1, except that the amounts of the 1,2,3,4-butanetetracarboxylic dianhydride (BDA) and 5-norbornene-2,3-dicarboxylic anhydride (NBA) were changed to 1.96 g (9.90 mmol) and 0.040 g (0.244 mmol), respectively, to obtain a solution of a polyimide precursor having a degree of polymerization n of 123 (number-average molecular weight, 43,800).

Example 7

A dimethylacetamide solution (3.7 mL) of 1.70 g (10.0 mmol) of isophoronediamine (IPDA) was added dropwise to a dimethylacetamide solution (13 mL) of 1.78 g (8.99 mmol) of 1,2,3,4-butanetetracarboxylic dianhydride (BDA) and 0.328 g (2.00 mmol) of 5-norbornene-2,3-dicarboxylic anhydride (NBA) at room temperature over 30 minutes. The resultant mixture was stirred at 60° C. for 24 hours to cause it to undergo a condensation polymerization reaction and thereby obtain a solution of a polyimide precursor represented by the following structural formula. Part of the solution was poured into acetone with stirring. As a result, a white solid precipitated. This solid was taken out by filtration, vacuum-dried, and then analyzed for structure by $^1$H NMR spectroscopy and IR spectroscopy.

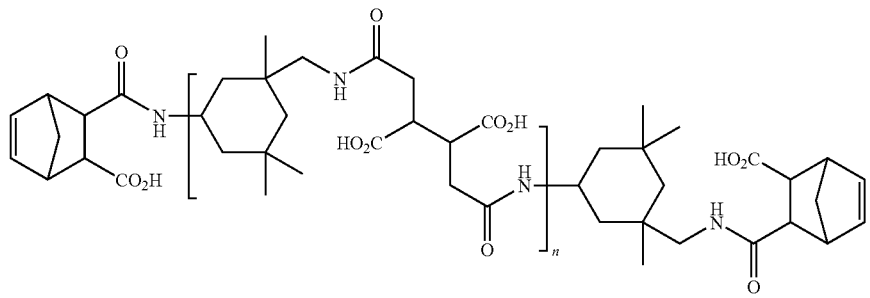

The degree of polymerization n thereof, as determined from integral ratio between the signal attributable to main-chain NH and the signal attributable to a terminal olefin, was found to be 15 (number-average molecular weight, 5,600).

Using the polyimide precursor solution, a blue light-emitting diode device was obtained in the same manner as in Example 1. The polyimide obtained by imidizing the polyimide precursor had the structure represented by the following structural formula.

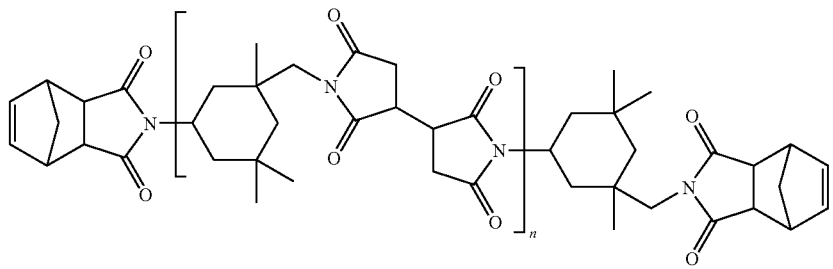

Example 8

A dimethylacetamide solution (3.7 mL) of 1.16 g (10.0 mmol) of hexamethylenediamine (HMDA) was added dropwise to a dimethylacetamide solution (13 mL) of 1.78 g (8.99 mmol) of 1,2,3,4-butanetetracarboxylic dianhydride (BDA) and 0.328 g (2.00 mmol) of 5-norbornene-2,3-dicarboxylic anhydride (NBA) at room temperature over 30 minutes. The resultant mixture was stirred at 60° C. for 24 hours to cause it to undergo a condensation polymerization reaction and thereby obtain a solution of a polyimide precursor represented by the following structural formula. Part of the solution was poured into acetone with stirring. As a result, a white solid precipitated. This solid was taken out by filtration, vacuum-dried, and then analyzed for structure by $^1$H NMR spectroscopy and IR spectroscopy.

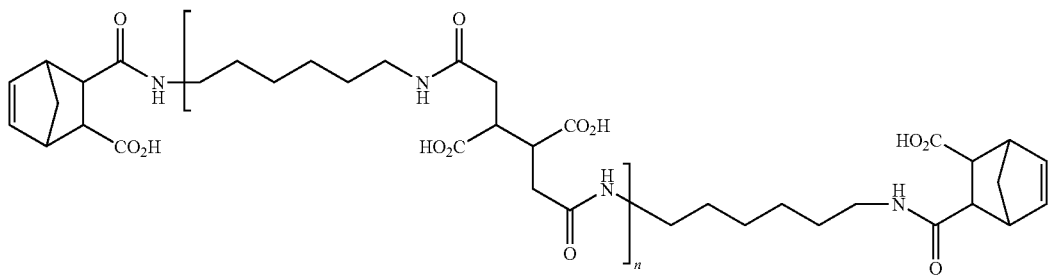

The degree of polymerization n thereof, as determined from integral ratio between the signal attributable to main-chain NH and the signal attributable to a terminal olefin, was found to be 10 (number-average molecular weight, 3,600).

Using the polyimide precursor solution, a blue light-emitting diode device was obtained in the same manner as in Example 1. The polyimide obtained by imidizing the polyimide precursor had the structure represented by the following structural formula.

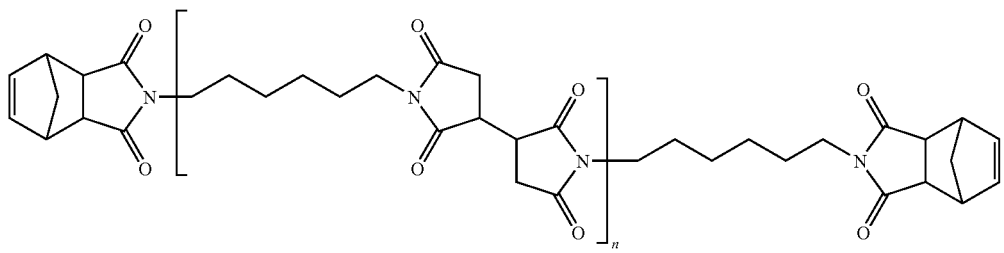

Example 9

A dimethylacetamide solution (3.7 mL) of 1.14 g (10.0 mmol) of 1,4-diaminocyclohexane (1,4-DACH) was added dropwise to a dimethylacetamide solution (13 mL) of 1.78 g (8.99 mmol) of 1,2,3,4-butanetetracarboxylic dianhydride (BDA) and 0.328 g (2.00 mmol) of 5-norbornene-2,3-dicarboxylic anhydride (NBA) at room temperature over 30 minutes. The resultant mixture was stirred at 60° C. for 24 hours to cause it to undergo a condensation polymerization reaction and thereby obtain a solution of a polyimide precursor represented by the following structural formula. Part of the solution was poured into acetone with stirring. As a result, a white solid precipitated. This solid was taken out by filtration, vacuum-dried, and then analyzed for structure by $^1$H NMR spectroscopy and IR spectroscopy.

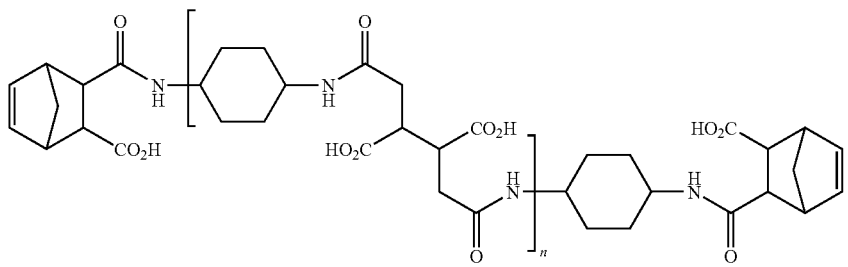

The degree of polymerization n thereof, as determined from integral ratio between the signal attributable to main-chain NH and the signal attributable to a terminal olefin, was found to be 14 (number-average molecular weight, 4,800).

Using the polyimide precursor solution, a blue light-emitting diode device was obtained in the same manner as in Example 1. The polyimide obtained by imidizing the polyimide precursor had the structure represented by the following structural formula.

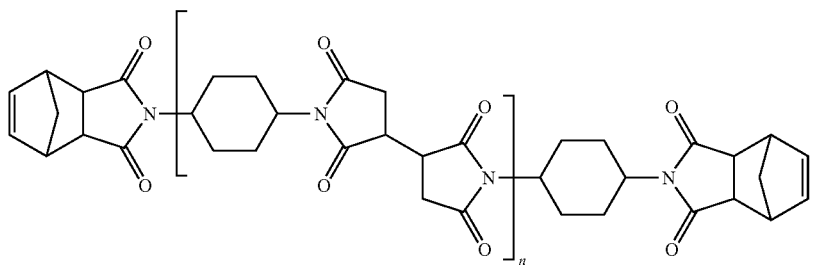

Comparative Example 1

In a nitrogen atmosphere, 4.22 g (0.0170 mol) of bis(3-aminophenyl)sulfone was added to 18 mL of N,N-dimethylacetamide and dissolved therein at 25° C. Thereto was added 5.00 g (0.0170 mol) of 3,3',4,4'-biphenyltetracarboxylic dianhydride. The resultant mixture was reacted with stirring at 25° C. for 4 days to obtain a solution of a polyimide precursor (wholly aromatic polyimide precursor; number-average molecular weight, 4,190). Using this solution, a blue light-emitting diode device was obtained in the same manner as in Example 1.

Comparative Example 2

Forty-five parts by weight of a bisphenol A epoxy resin having an epoxy equivalent of 7,500 (Epikote EP1256, manufactured by Japan Epoxy Resins Co., Ltd.), 30 parts by weight of an alicyclic epoxy resin having an epoxy equivalent of 260 (EHPE3150, manufactured by Daicel Chemical Industries, Ltd.), 22 parts by weight of 4-methylhexahydrophthalic anhydride (hardener; MH-700, manufactured by New Japan Chemical Co., Ltd.), and 1.2 parts by weight of 2-methylimidazole (hardening accelerator; manufactured by Shikoku Chemicals Corp.) were added to methyl ethyl ketone in such amounts as to result in a concentration of 50% by weight. The resultant mixture was stirred at 40° C. for 1 hour to obtain an epoxy resin solution for coating. Using this epoxy resin solution, a blue light-emitting diode device was obtained in the same manner as in Example 1.

The solutions (resins) obtained above were examined by the following evaluation methods. The results obtained are shown in Table 1.

(Light Transmittance)

The resin obtained in each of the Examples and Comparative Examples was examined for light transmittance at a wavelength of 400 nm with a spectrophotometer (U-4100, manufactured by Hitachi High-Technologies Corp.).

(Heat Resistance)

The resin obtained in each of the Examples and Comparative Examples was allowed to stand in a 150° C. hot-air drying oven for 100 hours. The resin which had undergone the 100-hour standing was visually examined for transparency. The resins which suffered no change from the original state are indicated by "good", and those which changed from the original state are indicated by "poor".

TABLE 1

| | Example 1 | Example 2 | Example 3 | Example 4 | Example 5 | Example 6 | Example 7 | Example 8 | Example 9 | Comparative Example 1 | Comparative Example 2 |
|---|---|---|---|---|---|---|---|---|---|---|---|
| Light transmittance (%) | 99.7 | 99.8 | 99.3 | 99.6 | 99.7 | 99.7 | 99.9 | 99.0 | 99.5 | 70.1 | 98.5 |
| Heat resistance | good | good | good | good | good | good | good | good | good | poor | poor |

It can be seen from the results given in Table 1 that the resins for optical-semiconductor-element encapsulation according to the invention have excellent heat resistance and excellent light-transmitting properties. Furthermore, the optical semiconductor devices obtained by encapsulating an optical semiconductor element with these resins combine excellent heat resistance and excellent light-transmitting properties.

While the present invention has been described in detail and with reference to specific embodiments thereof, it will be apparent to one skilled in the art that various changes and modifications can be made therein without departing from the scope thereof.

This application is based on Japanese patent application No. 2007-292310 filed Nov. 9, 2007, the entire contents thereof being hereby incorporated by reference.

Further, all references cited herein are incorporated in their entireties.

What is claimed is:

1. A resin for optical-semiconductor-element encapsulation comprising a polyimide which is produced by imidizing a polyimide precursor obtained by subjecting 5-norbornene- 2,3-dicarboxylic anhydride or maleic anhydride, an aliphatic tetracarboxylic dianhydride, and an aliphatic diamine compound to a condensation polymerization reaction.

2. The resin for optical-semiconductor-element encapsulation according to claim 1, wherein the aliphatic tetracarboxylic dianhydride is 1,2,3,4-butanetetracarboxylic dianhydride or 1,2,3,4-cyclopentanetetracarboxylic dianhydride.

3. The resin for optical-semiconductor-element encapsulation according to claim 1, wherein the aliphatic diamine compound is at least one member selected from the group consisting of the compounds represented by the following formulae (I) to (V):

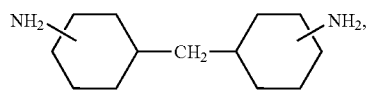  (I)

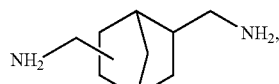  (II)

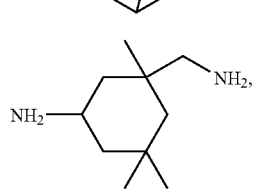  (III)

$$\text{NH}_2\underset{n}{\overbrace{\phantom{XXXX}}}\text{NH}_2 \quad (IV)$$

wherein n is an integer of 4 to 18, and (V)

wherein the structure shows a cyclohexane with NH₂ and —NH₂ substituents.

4. The resin for optical-semiconductor-element encapsulation according to claim 1, wherein the polyimide precursor has a number-average molecular weight of 3,000 to 50,000.

5. The resin for optical-semiconductor-element encapsulation according to claim 1, wherein the polyimide precursor has a degree of polymerization of 5 to 1,000.

6. The resin for optical-semiconductor-element encapsulation according to claim 1, which has a light transmittance, as measured at a wavelength of 400 nm, of 99% or higher.

7. An optical semiconductor device comprising an optical semiconductor element encapsulated with the resin according to claim 1.

8. The resin for optical-semiconductor-element encapsulation according to claim 1, wherein the polyimide has the following structure:

wherein n is 14.

9. The resin for optical-semiconductor-element encapsulation according to claim 1, wherein the polyimide has the following structure:

wherein n is 14.

10. The resin for optical-semiconductor-element encapsulation according to claim 1, wherein the polyimide has the following structure:

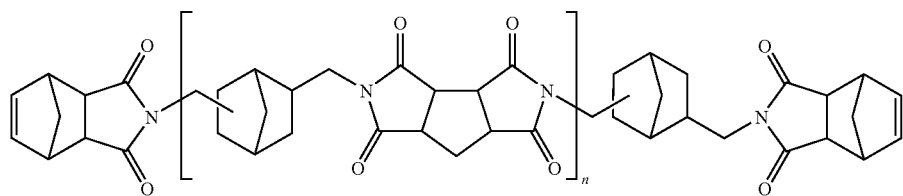

wherein n is 9.

11. The resin for optical-semiconductor-element encapsulation according to claim 1, wherein the polyimide has the following structure:

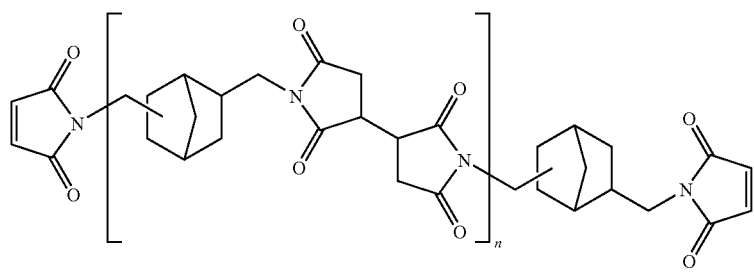

wherein n is 14.

12. The resin for optical-semiconductor-element encapsulation according to claim 1, wherein the polyimide has the following structure:

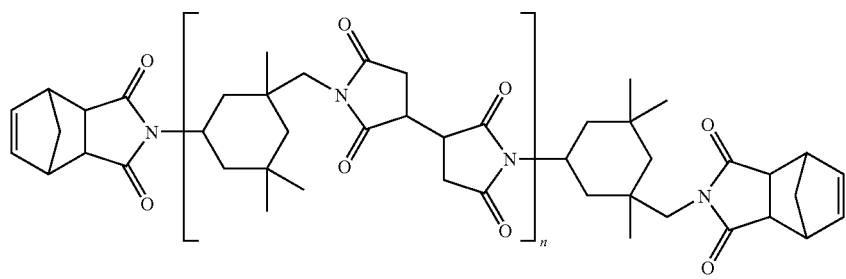

wherein n is 15.

13. The resin for optical-semiconductor-element encapsulation according to claim 1, wherein the polyimide has the following structure:

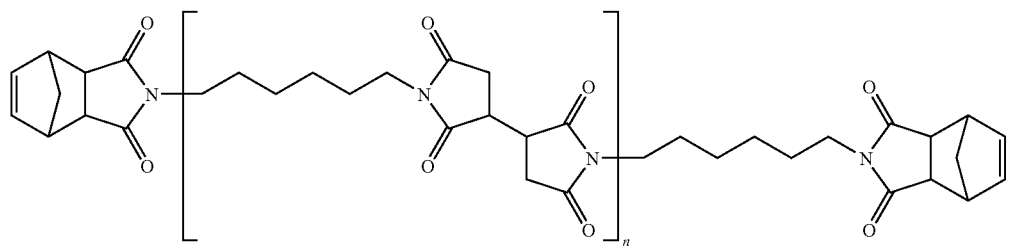

wherein n is 10.

14. The resin for optical-semiconductor-element encapsulation according to claim 1, wherein the polyimide has the following structure:
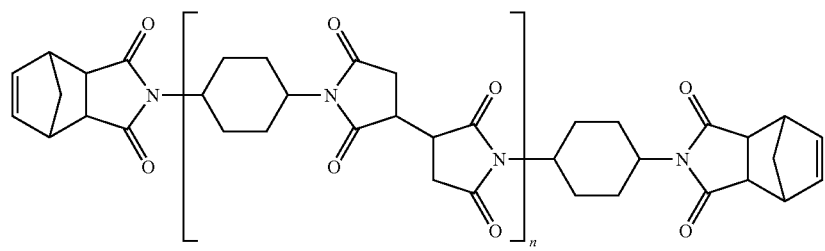
wherein n is 14.